United States Patent
Lataretu

(10) Patent No.: US 8,040,893 B2
(45) Date of Patent: Oct. 18, 2011

(54) METHOD FOR FAST SOURCE ROUTED CONNECTION SETUP

(75) Inventor: Florin-Josef Lataretu, Nuremberg (DE)

(73) Assignee: Alcatel Lucent, Paris (FR)

( * ) Notice: Subject to any disclaimer, the term of this patent is extended or adjusted under 35 U.S.C. 154(b) by 1002 days.

(21) Appl. No.: 10/916,205

(22) Filed: Aug. 11, 2004

(65) Prior Publication Data

US 2006/0034288 A1 Feb. 16, 2006

(51) Int. Cl.
*H04L 12/56* (2006.01)

(52) U.S. Cl. ........... 370/395.2; 370/395.3; 370/409; 709/226; 709/244

(58) Field of Classification Search .......... 370/351, 370/389, 395.1, 396, 400, 401, 402, 254, 370/322, 348, 399, 395.2–395.31, 409; 709/223, 709/226, 238–244

See application file for complete search history.

(56) References Cited

U.S. PATENT DOCUMENTS

| | | | | |
|---|---|---|---|---|
| 5,455,865 A * | 10/1995 | Perlman | ............ | 713/153 |
| 5,687,167 A * | 11/1997 | Bertin et al. | ............ | 370/254 |
| 5,832,197 A * | 11/1998 | Houji | ............ | 709/239 |
| 6,088,358 A * | 7/2000 | Tomita et al. | ............ | 370/395.2 |
| 6,097,723 A * | 8/2000 | Fielding et al. | ............ | 370/395.2 |
| 6,453,349 B1 * | 9/2002 | Kano et al. | ............ | 709/226 |
| 6,714,544 B1 * | 3/2004 | Bosloy et al. | ............ | 370/395.1 |
| 6,757,285 B1 * | 6/2004 | Lakhani et al. | ............ | 370/395.2 |
| 7,103,371 B1 * | 9/2006 | Liu | ............ | 370/348 |
| 7,693,122 B2 * | 4/2010 | Carlson et al. | ............ | 370/348 |
| 2001/0024443 A1 * | 9/2001 | Alriksson et al. | ............ | 370/401 |
| 2001/0032271 A1 * | 10/2001 | Allen | ............ | 709/239 |
| 2003/0048790 A1 * | 3/2003 | McAllister et al. | ............ | 370/395.2 |
| 2003/0177263 A1 * | 9/2003 | Robinson | ............ | 709/239 |
| 2003/0208585 A1 * | 11/2003 | Shinomiya et al. | ............ | 709/223 |
| 2004/0196784 A1 * | 10/2004 | Larsson et al. | ............ | 370/228 |
| 2005/0060400 A1 * | 3/2005 | Mannepalli et al. | ............ | 709/223 |
| 2005/0073992 A1 * | 4/2005 | Lee et al. | ............ | 370/351 |
| 2005/0111428 A1 * | 5/2005 | Orlik et al. | ............ | 370/344 |
| 2005/0169238 A1 * | 8/2005 | Yang et al. | ............ | 370/351 |
| 2005/0185632 A1 * | 8/2005 | Draves et al. | ............ | 370/351 |
| 2006/0245360 A1 * | 11/2006 | Ensor et al. | ............ | 370/238 |

OTHER PUBLICATIONS

David B. Johnson, David A. Maltz, and Josh Broch. DSR: The Dynamic Source Routing Protocol for Multi-Hop Wireless Ad Hoc Networks. in Ad Hoc Networking, edited by Charles E. Perkins, Chapter 5, pp. 139-172, Addison-Wesley, 2001.*

* cited by examiner

*Primary Examiner* — Kwang B Yao
*Assistant Examiner* — Jeffrey Rutkowski
(74) *Attorney, Agent, or Firm* — Wall & Tong, LLP

(57) ABSTRACT

The invention comprises a method for establishing a connection between a begin node and an end node in which parallel transmission and processing of connection request messages is used to minimize the dependency of connection setup time on connection path length.

11 Claims, 6 Drawing Sheets

METHOD FOR FAST SOURCE ROUTED CONNECTION SETUP

FIELD OF THE INVENTION

The invention relates to the field of communications networks, and more specifically, to establishing a connection path between a begin node and an end node using source routed connection setup.

BACKGROUND OF THE INVENTION

In automatically switched networks, a connection is a concatenation of link connections and sub-network connections that enable the transport of data from a source to a destination. A connection path through the network is a sequence of nodes starting with a begin node and terminating at an end node (optionally, traversing at least one intermediate node). There are numerous methods for provisioning a connection path through a network, including both manual path provisioning and automated path provisioning. The three basic types of algorithms currently used for automatic path provisioning include hierarchical routing, step-by-step routing, and source routing, where source routing is essentially a hop-by-hop interaction between the nodes in the connection path.

In current source routed connection establishment algorithms, sequential setup is employed to establish connections across a network having a plurality of nodes. In source routed connection setup, when a connection is to be set up in a network, a connection request message is generated in a begin node and transmitted from the begin node to a first intermediate node in a sequence of nodes that will be traversed by the connection. The first intermediate node processes the connection request message received from the begin node and then forwards the connection request message to the next intermediate node in the sequence. This process continues until the final intermediate node in the sequence transmits the connection request message to the end node in the sequence.

As the connection request message follows the traversed intermediate nodes along the connection path between the begin node and the end node, specific actions are performed at each of the intermediate nodes and the end node that require a certain amount of processing time. Such actions include receiving the message, reading the message, allocating the bandwidth required by the connection path, and the like. After the connection has been established, there is typically a handshake between the end node and the begin node in which the success or failure of the connection establishment is communicated from the end node to the begin node.

Using this method of serial transmission and processing, the connection setup time is calculated as the sum of the transmission times required to transmit the connection request message from one node in the sequence to the next node in the sequence, and the processing time that each node in the sequence spends processing the connection request message. Therefore, in this method, and other serial methods of establishing connections across a network having a plurality of nodes, the connection setup time is a direct function of the connection path length (number of nodes in the sequence).

Unfortunately, as the size of communication networks continues to grow, the connection paths provisioned through a network tend to traverse increasing numbers of nodes, significantly increasing the time required to establish a connection path through the network. This situation is exacerbated by the fact that increases in the size of communication networks typically results in significant increases in the number of connection paths that are to be established through the networks. Therefore, a faster method of performing source routed connection path provisioning is desired.

SUMMARY OF THE INVENTION

The present invention addresses various deficiencies of the prior art by providing a method for establishing a connection between a begin node and an end node by the parallel transmission and processing of connection request messages, thereby minimizing the dependency of the connection setup time on connection path length. Specifically, the method comprises contemporaneously transmitting respective connection request messages to each of a plurality of nodes scheduled to form a connection path, wherein the connection request messages are adapted to cause the plurality of nodes to initiate the formation of respective portions of the connection path in a substantially contemporaneous manner.

In one embodiment, using sequential synchronization, each intermediate node operates as a partial synchronization point for a previous intermediate node in the sequence of nodes scheduled to form a connection path. In this embodiment, each intermediate node transmits an acknowledgement message to a next intermediate node in the sequence, and the final intermediate node in the sequence transmits an acknowledgement message to the end node in the sequence.

In another embodiment, using parallel synchronization, the end node operates as a central synchronization point for each of the intermediate nodes in the sequence of nodes scheduled to be traversed by the connection. In this embodiment, each intermediate node transmits an acknowledgement message to the end node in the sequence.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of a mesh network topology; however, the methodology of the invention can readily be applied to other network topologies. The present invention employs a parallel approach to network connection setup that utilizes existing distributed processing potential to minimize the dependency of connection setup time on connection path length.

In parallel connection setup, rather than transmitting a single connection request message from a begin node to a first intermediate node (and so on, hop-by-hop, until the connection request message reaches the end node), a begin node contemporaneously transmits respective connection request messages to each of a plurality of nodes scheduled to form a connection path. The respective connection request messages are adapted to cause the plurality of nodes to initiate the formation of the respective portions of the connection path (in a substantially contemporaneous manner).

Figure 1:
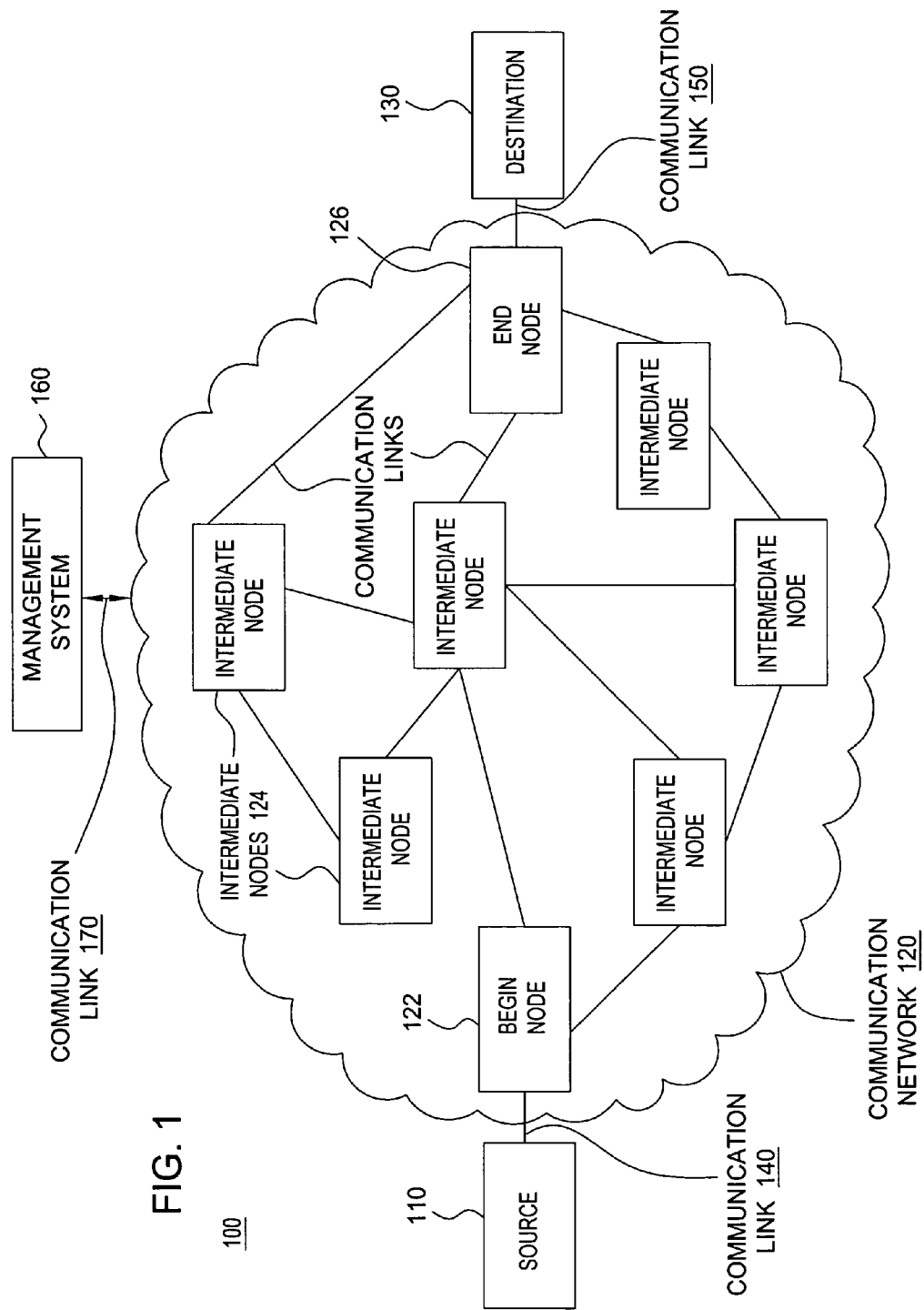
FIG. 1 depicts a high level block diagram of a communication network architecture.

FIG. 1 depicts a high level block diagram of a communication network architecture. Specifically, the communication network architecture 100 of FIG. 1 comprises a source node 110, a communication network 120, a destination node 130, a management system 160 and a communication link 170. The communication network 120 comprises a begin node 122, a plurality of intermediate nodes 124, and an end node 126 connected via a plurality of links 128.

The source node 110 is coupled to begin node 122 via at least one communication link 140. The destination node 130 is coupled to end node 126 via at least one communication link 150. Although not depicted in FIG. 1, it is well known in the art that source node 110 may be coupled to begin node 122, and similarly destination node 130 may be coupled to end node 126, through numerous network elements.

A connection path as described herein corresponds to a path through the communication network 120 from the begin node 122 to the end node 126, traversing at least one of the plurality of intermediate nodes 124. As depicted in FIG. 1, the source node 110 represents the source of some information that will be transferred over the connection established between the begin node 122 and the end node 126 in communication network 120. As depicted in FIG. 1, the destination node 130 represents the destination of some information that will be transferred over the connection established between the begin node 122 and the end node 126 in communication network 120. As such, the source node 110 and the destination node 130 are at least one of a user terminal, a router, a sub-network edge node, and the like.

Figure 2:
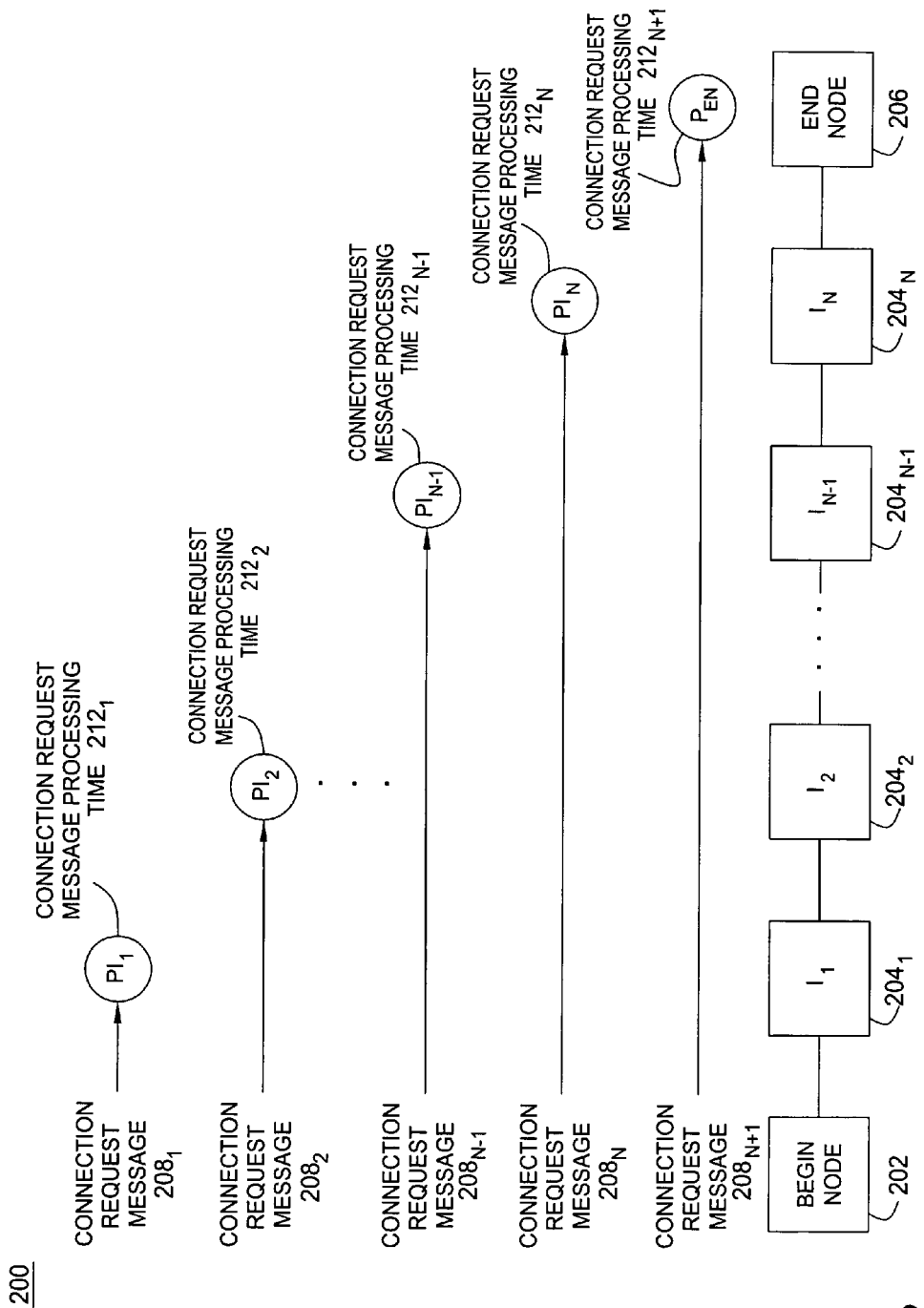
FIG. 2 depicts a high level diagram of a method of establishing a connection between a begin node and an end node through at least one intermediate node, in which no connection setup acknowledgement is performed.

FIG. 2 depicts a high level diagram of a method of establishing a connection path between a begin node and an end node through at least one of a plurality of intermediate nodes, in which no connection setup acknowledgement is performed. Specifically, the connection establishment method 200 of FIG. 2 depicts the signaling and processing required in order to establish a connection between a begin node 202 and an end node 206 through a plurality of intermediate nodes $204_1$ through $204_N$ (collectively intermediate nodes 204).

As depicted in FIG. 2, the begin node 202 is coupled to the end node 206 through the plurality of intermediate nodes 204. The intermediate nodes 204 are connected in a point-to-point topology. Although a plurality of intermediate nodes are depicted in FIG. 2, the method of the present invention can be implemented using at least one intermediate node.

The process of establishing the connection path is initiated when one of the nodes in the plurality of nodes scheduled to form a connection path receives a connection request message. In one embodiment, the connection request message is received from another node in communication with the plurality of nodes scheduled to form the connection path (illustratively, source node 110 depicted in FIG. 1). In another embodiment, the connection request message is received from a management system in communication with the plurality of nodes scheduled to form the connection path (illustratively, management system 160 depicted in FIG. 1).

As depicted in FIG. 2, the begin node 202 determines that a connection is scheduled to be established between the begin node 202 and the end node 206. The begin node 202 determines a sequence of nodes scheduled to form a connection path (a sequence of nodes scheduled to be traversed by the connection). As depicted in FIG. 2, the sequence of nodes scheduled to form a connection path comprises the begin node 202, the intermediate nodes 204 and the end node 206.

After determining the nodes scheduled to form the connection path, begin node 202 contemporaneously transmits respective connection request messages $208_1$ through $208_{N+1}$ (collectively connection request messages 208) to each of the corresponding intermediate nodes 204 and the end node 206. The respective connection request messages 208 are adapted to cause each of the intermediate nodes 204 and the end node 206 to initiate formation of the respective portions of the communication path in a substantially contemporaneous manner.

In other words, respective connection request messages 208 are adapted to cause each of the respective intermediate nodes 204 and end node 206 to configure the required cross-connects on each of the respective intermediate nodes 204 and end node 206. The length of time that the connection request messages 208 require to reach their intended destinations are respective connection request message transmission times.

As each of the intermediate nodes 204 and end node 206 to which the connection request messages 208 are sent receive the respective connection request messages 208, the intermediate nodes 204 and end node 206 begin processing the connection request messages 208. As depicted in FIG. 2, the length of time that the intermediate nodes 204 and the end node 206 require to process the connection request messages 208 are represented by connection request message processing times $212_1$ through $212_{N+1}$ (collectively connection request message processing times 212), respectively.

As depicted in FIG. 2, connection request message processing time $PI_1$ corresponds to the processing time on intermediate node $204_1$, connection request message processing time $PI_2$ corresponds to the processing time on intermediate node $204_2$, with similar relationships existing between connection request message processing times $PI_3$ through $PI_{N-1}$ and respective intermediate nodes $204_3$ through $204_N$. Similarly, connection request message processing time $P_{EN}$ corresponds to the processing time on the end node 206.

If successful, the processing of respective connection request messages 208 results in the formation of the respective portions of the communication path. For example, the successful processing of connection request message $208_1$ results in the creation of a cross-connect (or other representation of a connection through the switching fabric of a node, as known in the art) on the intermediate node $204_1$. Following the successful creation of the connection path from the begin node 202 to the end node 206, that cross-connect on intermediate node $204_1$ enables intermediate node $204_1$ to receive data from the begin node 202, and to transmit that data to the next node in the sequence of nodes forming the connection path (intermediate node $204_2$ as depicted in FIG. 2).

Thus, as depicted in FIG. 2 and described herein, the transmitting and processing of the respective connection request messages 208 is performed in parallel, as opposed to a serial connection setup algorithm in which a first node does not transmit a connection request message to a next node until that first node has finished processing the connection request message.

The determination by the begin node 202 that a connection is scheduled to be established is accomplished using at least one of a plurality of methods. In one embodiment, the begin node 202 receives a connection setup message from an upstream node, illustratively, source node 110 as depicted in FIG. 1. In another embodiment, the begin node 202 receives a connection setup message from a downstream node, illustratively, destination node 130 as depicted in FIG. 1. In another embodiment, the begin node 202 receives a connection setup message from a node not in the sequence of nodes scheduled to be traversed by the connection. In another embodiment, the begin node 202 receives a connection setup message from a management system in communication with begin node 202, illustratively, management system 160 as depicted in FIG. 1.

The determination by begin node 202 of the sequence of nodes scheduled to be traversed by the connection is accomplished using at least one of a plurality of methods. In one embodiment, the begin node 202 receives a list of the plurality of nodes scheduled to form a connection path as a portion of a connection setup message received from at least one of an upstream node, a downstream node, a node that does not belong to the sequence of nodes scheduled to be traversed by the connection and a management system in communication with the begin node 202.

In another embodiment, the begin node 202 retrieves the sequence of nodes scheduled to be traversed by the connection from a routing table. In this embodiment, the use of a routing table to determine the sequence of nodes is accomplished by at least one of a plurality of methods. In one embodiment, the routing table is stored on begin node 202. In another embodiment, the routing table is retrieved by (or transmitted to) the begin node from at least one of another node within the network and a management system in communication with the begin node 202.

The routing of the connection request messages 208 from the begin node 202 to each of the corresponding intermediate nodes 204 and end node 206 for which the connection request messages 208 are intended, is accomplished by at least one of a plurality of methods. In one embodiment, the connection request messages 208 transmitted by the begin node 202 traverse the sequence of nodes scheduled to be traversed by the connection. In another embodiment, the connection request messages 208 transmitted by the begin node 202 traverse at least one of a plurality of available paths between the begin node 202 and each of the intermediate nodes 204 and the end node 206 for which the connection request messages 208 are intended, respectively.

Therefore, according to the embodiment depicted in FIG. 2, the total connection setup time without acknowledgement is given by the equation: $MAX(T_{BN\_IN/EN})+MAX(P_{IN/EN})$, where $MAX(T_{BN\_IN/EN})$ corresponds to the maximum connection request message transmission time (chosen from the set of respective connection request message transmission times), and $MAX(P_{IN/EN})$ corresponds to the maximum connection request message processing time (chosen from the set of connection request message processing times 212).

Figure 3:
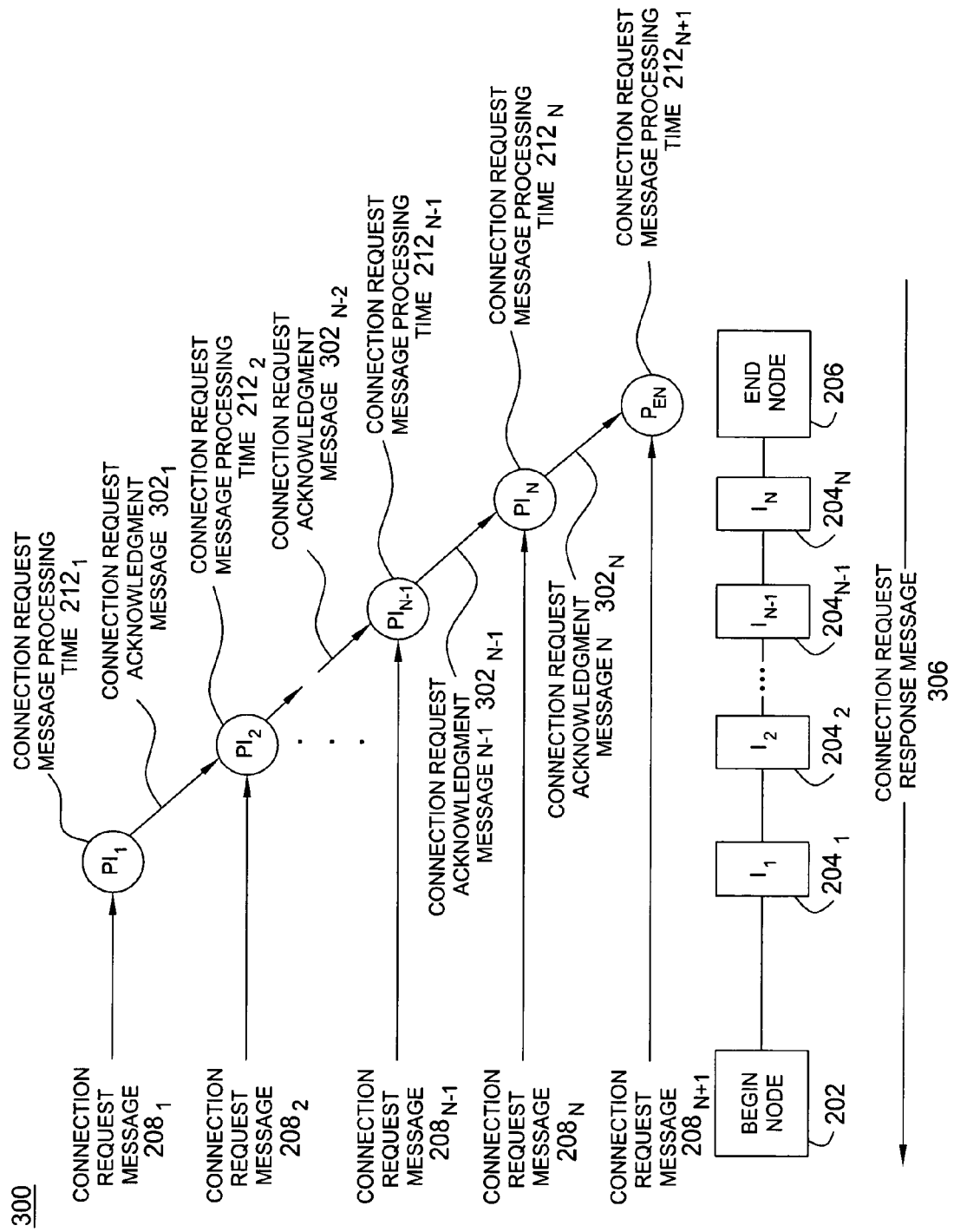
FIG. 3 depicts a high level diagram of a method of establishing a connection between a begin node and an end node through at least one intermediate node, in which serial connection setup acknowledgement is performed.

FIG. 3 depicts a high level diagram of a method of establishing a connection between a begin node and an end node through at least one of a plurality of intermediate nodes, in which serial connection setup acknowledgement is performed. A portion of the connection establishment method 300 of FIG. 3 is identical to the connection establishment method 200 as depicted in FIG. 2 and described herein. As such, the elements of FIG. 3 which are the same as elements depicted in FIG. 2 are represented with identical reference numbers.

The connection establishment method 300 of FIG. 3 includes serial connection request acknowledgement (not depicted in FIG. 2). In this embodiment, partial synchronization points on each of the intermediate nodes 204 are used to reduce the time required to complete the establishment of a connection, and to provide information about the status of the connection establishment on each of the previous intermediate nodes.

During the processing of the respective connection request messages 208 by the intermediate nodes 204 (excluding connection request message $208_{N+1}$, which is processed by end node 206), each of the intermediate nodes 204 creates and transmits respective connection request acknowledgment messages $302_1$ through $302_N$ (collectively connection request acknowledgement messages 302) towards the end node 206. In this embodiment, each of the connection request acknowledgement messages 302 transmitted towards the end node 206 has a next intermediate node in the sequence of nodes scheduled to form a connection path as an intended final destination. In one embodiment, the processing of connection request message $208_{N+1}$ by end node 206 results in an internal connection request acknowledgement generated and processed by the end node 206.

For the purposes of clarity by example, consider intermediate node $204_1$ depicted in FIG. 3. As part of the processing of the connection request message $208_1$ by intermediate node $204_1$, the intermediate node $204_1$ creates connection request acknowledgement message $302_1$. The intermediate node $204_1$ then transmits connection request acknowledgement message $302_1$ towards the next node in the sequence of nodes over which the connection is being established, in this example intermediate node $204_2$.

This process is performed by each of the intermediate nodes 204 such that each of the intermediate nodes $204_1$ through $204_N$ has associated with it one of the corresponding connection request acknowledgement messages $302_1$ through $302_N$. The process is repeated by each of the intermediate nodes 204 until a final connection request acknowledgement message $302_N$ is transmitted from the intermediate node $204_N$ to the end node 206. After end node 206 receives connection request acknowledgement message $302_N$ from intermediate node $204_N$, the success of the connection establishment is determined, and a connection request response message 304 is transmitted from the end node 206 towards the begin node 202.

If each of the connection request acknowledgment messages 302 is successfully received, and each received connection request acknowledgement message 302 is a positive acknowledgement message, the connection is considered successfully established. A positive acknowledgement message indicates that the connection request message was successfully processed (the connection was successfully provisioned). After determining that the connection has been successfully established, the end node 206 transmits connection request response message 304 towards the begin node 202 in order to notify the begin node 202 that the connection is successfully established. In this embodiment, the connection request response message 304 is a "connection setup successful" message.

The notification of the begin node 202 that the connection is successfully established is accomplished by at least one of a plurality of methods. In one embodiment, the "connection setup successful" message transmitted towards the begin node 202 traverses the sequence of nodes over which the connection was established. In another embodiment, the "connection setup successful" message transmitted towards the begin node 202 traverses one of a plurality of paths in the network between the end node 206 and begin node 202.

There are numerous conditions that result in the failure of the connection to be established, and which therefore result in a determination by the end node 206 that the connection establishment failed. If at least one of the connection request acknowledgment messages 302 is not received, or not received within a threshold time, the connection establishment is considered to have failed. If at least one of the connection request acknowledgement messages 302 is a negative acknowledgement message the connection establishment is considered to have failed. In both situations, the connection request response message 304 is a "connection setup failure" message.

The notification of the begin node 202 that the connection is not successfully established is accomplished by at least one of a plurality of methods. In one embodiment, the "connection setup failure" message transmitted towards the begin node 202 traverses the sequence of nodes over which the connection was scheduled to be established. In another embodiment, the "connection setup failure message" transmitted towards the begin node 202 traverses one of a plurality of paths in the network between the end node 206 and begin node 202.

Therefore, according to the embodiment of FIG. 3, an approximation of the total connection setup time with serial acknowledgement is given by the equation: $MAX(T_{BN\_IN/EN}+P_{IN/EN})+SUM(T_{IN(M)\_IN(N-1)})+T_{IN(N)\_EN}$. In this equation, the $MAX(T_{BN\_IN/EN}+P_{IN/EN})$ term corresponds to the maximum value chosen from the set of the summations of the respective connection request message transmission times and the connection request message processing times 212 associated with each of the intermediate nodes 204.

Furthermore, the $SUM(T_{IN(M)\_IN(N-1)})$ term corresponds to the summation of the connection request acknowledgement message transmission times associated with intermediate nodes $204_M$ through $204_{N-1}$ (where IN(M) represents intermediate node $204_M$, the intermediate node that yielded the maximum value given by the $MAX(T_{BN\to IN/EN}+P_{IN/EN})$ term), and the $T_{IN(N)\_EN}$ term corresponds to connection request acknowledgement message transmission time associated with intermediate node $204_N$. In the embodiment in which M=N, in which $MAX(T_{BN\_IN/EN}+P_{IN/EN})$ is associated with intermediate node $204_N$, the $SUM(T_{IN(M)\_IN(N-1)})$ term is equal to zero.

The equation above is an approximation based on two assumptions. The first assumption is that the connection request message processing times 212 are larger than the transmission times (both the connection request message transmission times and the connection request acknowledgement message transmission times). The second assumption is that the connection request acknowledgement message transmission times are smaller than connection request message transmission times. In one embodiment, in which either of the two assumptions fails to hold, a modified version of the equation becomes valid. Although a modified version of the equation becomes valid, the connection establishment time savings remain.

Figure 4:
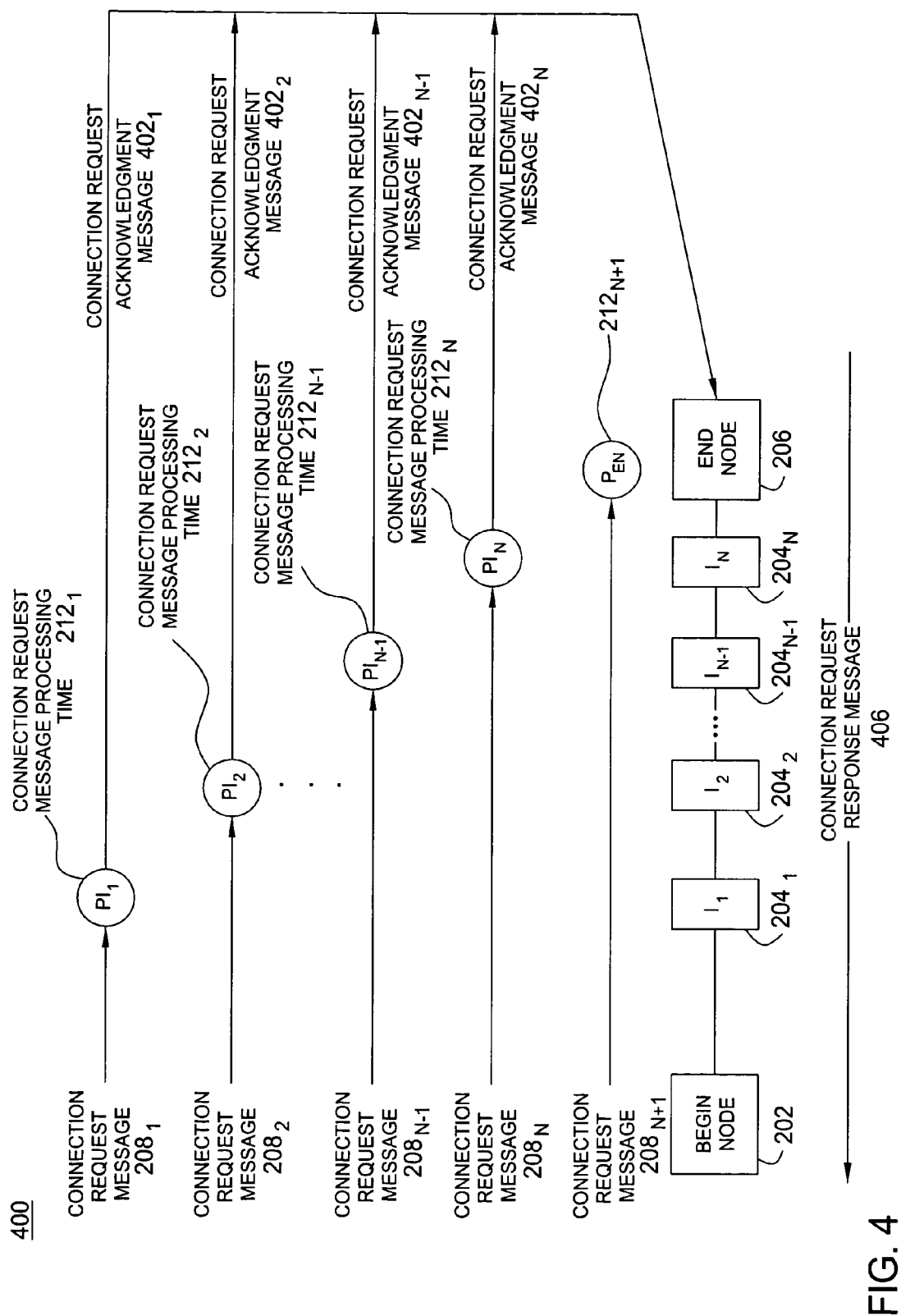
FIG. 4 depicts a high level diagram of a method of establishing a connection between a begin node and an end node through at least one intermediate node, in which parallel connection setup acknowledgement is performed.

FIG. 4 depicts a high level diagram of a method of establishing a connection between a begin node and an end node through at least one intermediate node, in which parallel connection setup acknowledgement is performed. Specifically, the connection establishment method 400 of FIG. 4 is identical to the connection establishment method 200 as depicted in FIG. 2 and described herein. As such, the elements of FIG. 4 which are the same as elements depicted in FIG. 2 are represented with identical reference numbers.

The connection establishment method 400 of FIG. 4 includes parallel connection request acknowledgement. In this embodiment, the synchronization points on the intermediate nodes are not of interest. The partial acknowledgement messages, which are generated by each of the intermediate nodes 204 as part of the processing of the connection request messages 208, are transmitted towards end node 206, where a central synchronization point is established. In this embodiment, each of the connection request acknowledgement messages 402 transmitted towards the end node 206 is transmitted with the end node 206 intended as the final destination.

During the processing of the respective connection request messages 208 by the intermediate nodes 204 (excluding connection request message $208_{N+1}$, which is processed by the end node 206), each of the intermediate nodes 204 creates and transmits respective connection request acknowledgment messages $402_1$ through $402_N$ (collectively connection request acknowledgement messages 402) towards the end node 206.

In this embodiment, as described herein, each of the connection request acknowledgement messages 402 is transmitted towards the end node 206 with the end node 206 as the intended final destination. The lengths of time that connection request acknowledgement messages 402 require to reach the end node 206 are the respective connection request acknowledgement message transmission times.

For the purposes of clarity by example, consider intermediate node $204_1$ depicted in FIG. 4. Following the completion of the processing of the connection request message $208_1$ by intermediate node $204_1$, the intermediate node $204_1$ creates connection request acknowledgement message $402_1$. The intermediate node $204_1$ then transmits connection request acknowledgement message $402_1$ towards the end node 206.

This process is performed by each of the intermediate nodes 204 such that each of the intermediate nodes $204_1$ through $204_N$ has associated with it one of the corresponding connection request acknowledgement messages $402_1$ through $402_N$. The process is repeated by each of the intermediate nodes 204 until a final connection request acknowledgement message $402_N$ is transmitted from the intermediate node $204_N$ to the end node 206.

After the end node 206 finishes processing the connection request message $208_{N+1}$, end node 206 uses the connection request acknowledgment messages 402 in order to determine the success of connection establishment. A connection request response message 406 is transmitted from the end node 206 towards the begin node 202 based on the result of that determination.

If each of the connection request acknowledgment messages 402 is successfully received, and each received connection request acknowledgement messages 402 is a positive acknowledgement message, the connection path is considered successfully established. A positive acknowledgement message indicates that the connection request message was successfully processed (the connection was successfully provisioned).

After determining that the connection has been successfully established, the end node 206 transmits connection request response message 406 towards the begin node 202 in order to notify the begin node 202 that the connection is successfully established. In this embodiment, the connection request response message 406 is a "connection setup successful" message.

The notification of the begin node 202 that the connection is successfully established is accomplished using at least one of a plurality of methods. In one embodiment, the "connection setup successful" message transmitted towards the begin node 202 traverses the sequence of nodes over which the connection was established. In another embodiment, the "connection setup successful" message transmitted towards the begin node 202 traverses one of a plurality of paths in the network between the end node 206 and begin node 202.

There are numerous conditions that result in failure of the connection to be established, and which therefore result in a determination that the connection establishment failed. If at least one of the connection request acknowledgment messages 402 is not received, or not received within a threshold time, the connection establishment is considered a failure. If at least one of the connection request acknowledgement messages 402 is a negative acknowledgement message the connection establishment is considered to have failed. In both situations, the connection request response message 406 is a "connection setup failure" message.

The notification of begin node 202 that the connection is not successfully established is accomplished by at least one of a plurality of methods. In one embodiment, the "connection setup failure" message transmitted towards the begin node 202 traverses the sequence of nodes over which the connection was scheduled to be established. In another embodiment, the "connection setup failure" message transmitted towards the begin node 202 traverses one of a plurality of paths in the network between the end node 206 and begin node 202.

Thus, according to the embodiment depicted in FIG. 4, the total connection setup time with parallel acknowledgement is given by the equation: $MAX(T_{BN\_IN/EN}) + MAX(P_{IN/EN}) + MAX(T_{IN\_EN})$, wherein $MAX(T_{BN\_IN/EN})$ corresponds to the maximum connection request message transmission time (chosen from the set of respective connection request message transmission times), $max(P_{IN/EN})$ corresponds to the maximum connection request message processing time (chosen from the set of connection request message processing times 212) and $max(T_{IN\_EN})$ corresponds to the maximum connection request acknowledgement message transmission time (chosen from the set of respective connection request acknowledgement message transmission times).

Figure 5:
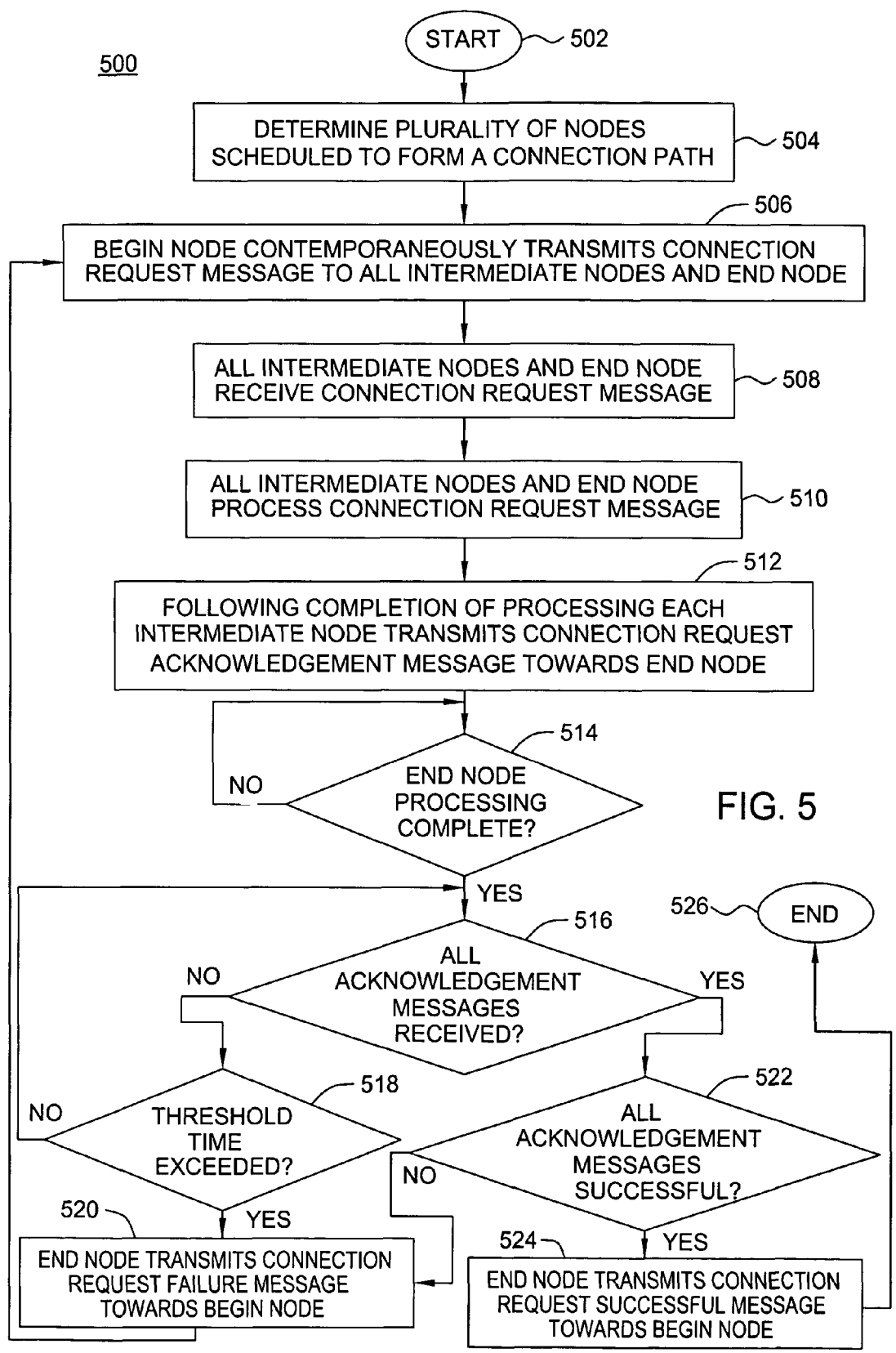
FIG. 5 depicts a flow diagram of a method according to the present invention.

FIG. 5 depicts a flow diagram of a method according to the present invention. Specifically, FIG. 5 depicts a flow diagram of a method 500 for establishing a connection between a begin node and an end node through at least one intermediate node. The method 500 of FIG. 5 is entered at step 502 and proceeds to step 504.

At step 504, a begin node identifies a sequence of nodes that are scheduled to form a connection path (over which a connection is scheduled to be established). The sequence of nodes includes a begin node, a plurality of intermediate nodes and an end node. At step 506, the begin node contemporaneously transmits respective connection request messages to each of the plurality of intermediate nodes and the end node that are scheduled to form a connection path in order to initiate the formation of respective portions of the connection path in a substantially contemporaneous manner.

At step 508, each of the plurality of intermediate nodes and the end node receive the respective connection request messages transmitted by the begin node in step 506. At step 510, each of the plurality of intermediate nodes and the end node process the respective connection request messages. The processing of connection request messages results in initiation of the formation of respective portions of the connection path. Thus, the processing of connection request messages includes establishment of a connection (cross-connect) on the node that received the connection request message, determination of the adjacent nodes in the connection path and the like. Following the processing required for establishment of the cross-connect on the node that received the connection request message, the node performs processing required to create a corresponding connection request acknowledgement message.

Since the connection request messages are transmitted by the begin node contemporaneously, step 508 and step 510 are performed in parallel. As such, depending on the length of the respective connection request message transmission times, each of step 508 and step 510 may be performed multiple times on different intermediate nodes (and the end node) prior to the other step being performed once.

At step 512, as the processing of the connection request messages is completed (including the creation of a connection request acknowledgement message), each of the plurality of intermediate nodes transmits a connection request acknowledgment message towards the end node. In general, the intended destination node is the node that will process the respective connection request acknowledgement message. The intended destination node of the respective connection request acknowledgement messages depends on the type of acknowledgement synchronization being performed.

In one embodiment, in which serial acknowledgement is implemented, each of the plurality of intermediate nodes transmits a respective connection request acknowledgement message towards the end node with the next node in the plurality of nodes scheduled to form the connection path as the intended destination node of the connection request acknowledgement message.

In another embodiment, in which parallel acknowledgment is implemented, each of the plurality of intermediate nodes transmits a respective connection request acknowledgement message towards the end node with the end node as the intended destination node of the connection request acknowledgement message. In this embodiment, routing of the respective connection request acknowledgement messages is accomplished using at least one of a plurality of methods.

In one embodiment the connection request acknowledgement messages traverse the sequence of nodes scheduled to be traversed by the connection. In another embodiment the connection request acknowledgement messages traverse respective paths including a subset of nodes scheduled to be traversed by the connection path, wherein the subset of nodes includes at least one node that is not traversed by the respective connection request messages. In another embodiment, the connection request acknowledgement messages traverse at least one of a plurality of available paths between the intermediate node from which a connection request acknowledgement message is transmitted and the end node.

As described herein, the steps 508, 510 and 512 are performed in parallel. At step 514, the end node determines if processing of the connection request message received by the end node is complete. If the end node has completed the processing of the connection request message, the method 500 proceeds to step 516. If the end node has not completed the processing of the connection request message, the end node continues to monitor the progress of the connection request message processing until the processing is complete. Thus, step 514 is performed recursively as long as the end node has not completed the processing of the connection request message. At step 516, a determination is made as to whether all connection request acknowledgement messages have been received.

In one embodiment, in which serial acknowledgement is performed, the end node determines if the connection request acknowledgement message has been received from the final intermediate node in the sequence of nodes scheduled to form the connection path. The end node determines the sequence of nodes over which the connection is scheduled to be established from the connection request message received from the begin node. As such, the end node is able to determine if the connection request acknowledgement message has been received from the final intermediate node.

In another embodiment, in which parallel acknowledgement is performed, the end node determines if a connection request acknowledgement message has been received from each of the intermediate nodes in the sequence of nodes over which the connection is scheduled to be established. The end node determines the sequence of nodes over which the connection is scheduled to be established from the connection request message received from the begin node. As such, the end node is able to determine if the respective connection request acknowledgement messages have been received from each of the plurality of nodes scheduled to form the connection path.

If all expected connection request acknowledgement messages have not been received, the method 500 proceeds to step 518. If all expected connection request acknowledgement messages have been received, the method 500 proceeds to step 522. As defined above, using serial acknowledgement, only one connection request acknowledgement message is expected. As defined above, using parallel acknowledgement, one connection request acknowledgement message is expected from each intermediate node in the plurality of nodes scheduled to form the connection path.

At step 518, the end node determines whether a threshold time in which the acknowledgement messages must be received in order to successfully complete the connection has been exceeded. If the threshold time has not been exceeded, the method 500 returns to step 516. If the threshold time has been exceeded, the method 500 proceeds to step 520. The establishment of the threshold time is accomplished using at least one of a plurality of methods.

In one embodiment, the threshold time is communicated to the end node as a portion of the connection request message. In another embodiment, the threshold time is calculated by the end node as a function of the length of the connection that is scheduled to be established (number of nodes scheduled to be traversed by the connection). In still another embodiment, the threshold time is communicated to the end node by a management system in communication with the end node.

At step 520, the end node transmits a "connection setup failure" message to the begin node that contemporaneously transmitted the respective connection request messages. The transmission of the "connection setup failure" message is accomplished using at least one of a plurality of methods. In one embodiment, the "connection setup failure" message is transmitted from the end node along the sequence of nodes scheduled to form the connection path. In another embodiment, the "connection setup failure" message is transmitted over at least one of a plurality of paths between the end node and the begin node.

After notification of the begin node by the end node that the connection setup failed (via the connection setup failure message), method 500 optionally proceeds to one of two possible steps in the method 500. In one embodiment, the method 500 optionally proceeds to step 526 where the method 500 ends. In another embodiment, the method 500 optionally proceeds to step 504 to begin another attempt to establish the connection.

At step 522, the end node determines whether all connection request acknowledgment messages are positive acknowledgment messages. A positive acknowledgement message indicates that the connection request message was successfully received by one of the plurality of nodes scheduled to form the connection path, and that the connection request message was successfully processed (the connection was successfully provisioned) by that node. If at least one of the connection request acknowledgement messages is a negative acknowledgment message (the connection was not successfully provisioned on that node), the method 500 proceeds to step 520, described above. If all of the connection request acknowledgment messages are positive acknowledgment messages, the method 500 proceeds to step 524.

At step 524, the end node transmits a "connection setup successful" message to the begin node. The transmission of a "connection setup successful" message is accomplished using at least one of a plurality of methods. In one embodiment, the "connection setup successful" message is transmitted along the sequence of nodes over which the connection path was successfully established. In another embodiment, the connection setup successful message is transmitted over at least one of a plurality of paths between the end node and the begin node. The method 500 then proceeds to step 526 where the method 500 ends.

According to one embodiment of the present invention, in which parallel acknowledgement is performed, the total connection setup time becomes the sum of the following: the maximum connection request message transmission time, the maximum connection request message processing time and the maximum connection request acknowledgement message transmission time. Therefore, the strict dependency of connection setup time on the connection path length is eliminated, significantly reducing the time required to establish a connection path across a plurality of nodes in a communication network.

In one embodiment, in which the network over which the connection path is established has a mesh network topology, a best-case connection setup time is achieved. In this embodiment, the best-case connection setup time (without acknowledgement) is given by the equation: $P_{IN/EN}+(2\times(T_{IN/EN}))$, where $P_{IN/EN}$ represents the connection request message processing time associated with each of the plurality of intermediate nodes and the end node, and $T_{IN/EN}$ represents the connection request message transmission time associated with each of the plurality of intermediate nodes and the end node.

This embodiment is based on the assumptions that all connection request message processing times are equal and that all connection request message transmission times are equal. These assumptions eliminate the need to apply the "maximum" function to the entire set of connection request message transmission times and the entire set of connection request message processing times.

In another embodiment, in which the network over which the connection path is established only has point-to-point access between the nodes in the sequence of nodes of the connection, a worst-case connection setup time is achieved. In this embodiment, the worst-case connection setup time (without acknowledgement) is given by the equation: $P_{IN/EN}+\text{SUM}(T_{IN/EN})$, where $P_{IN/EN}$ corresponds to the connection request message processing time associated with each of the plurality of intermediate nodes and the end node, and $\text{SUM}(T_{IN/EN})$ corresponds to the sum of the connection request message transmission time associated with each of the plurality of intermediate nodes and the end node.

This embodiment is based on the assumptions that all connection request message processing times are equal and that all connection request message transmission times are equal. Although these assumptions eliminate the need to apply the "maximum" function to the entire set of connection request message transmission times and the entire set of connection request message processing times, the serial nature of the network topology requires the use of a "summation" function in order to calculate the total connection request message transmission time.

Although this embodiment is described as resulting in a worst-case connection setup time, as compared to the traditional connection setup time the connection setup time achieved using the present invention is still reduced by at least: $(N-1)(P_{IN/EN})$, where $P_{IN/EN}$ represents the connection request message processing time associated with each of the plurality of intermediate nodes and the end node, and N represents the number of intermediate nodes in the sequence of nodes over which the connection is established.

Figure 6:
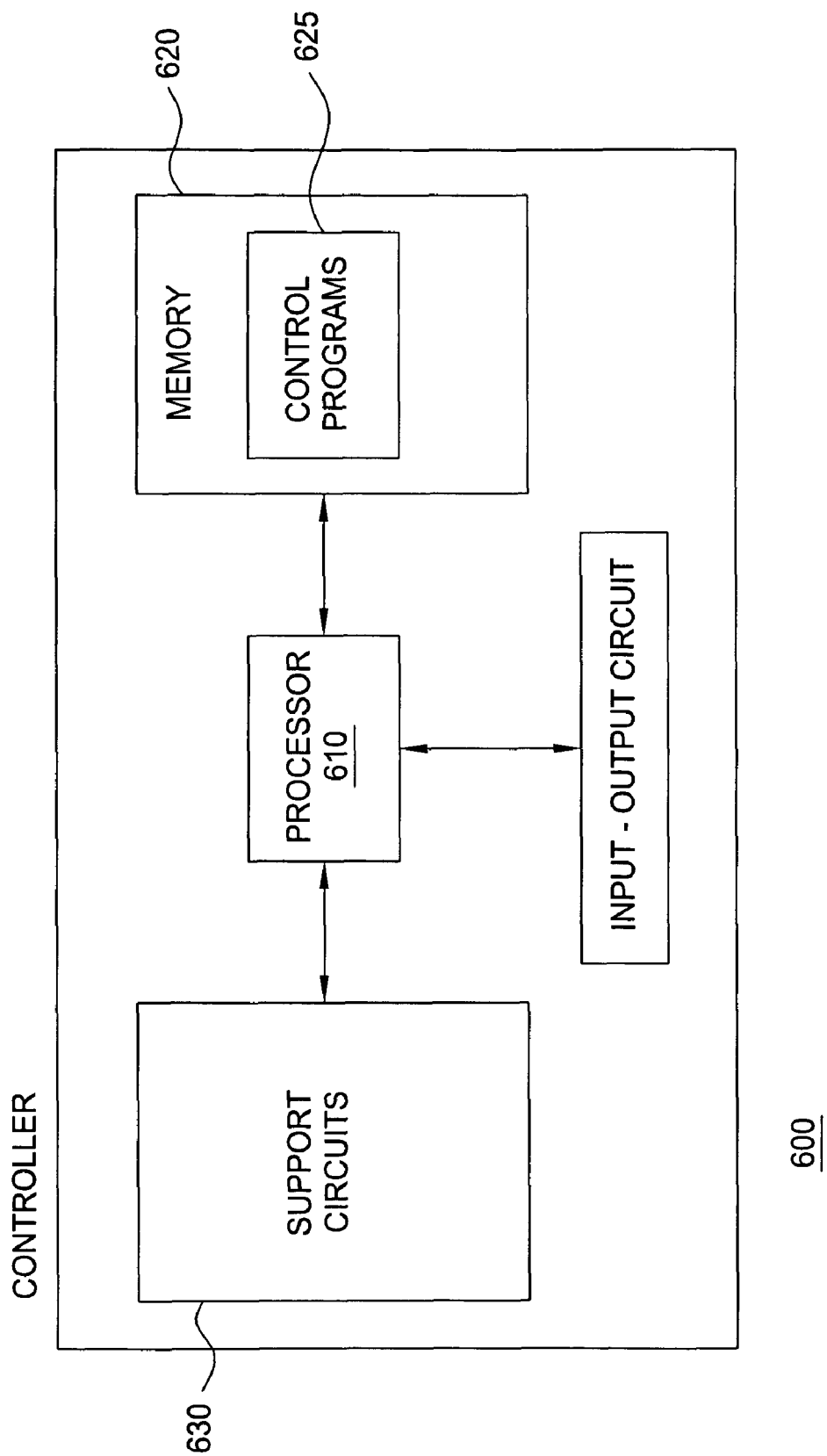
FIG. 6 depicts a high level block diagram of a controller suitable for performing the methods of the present invention.

FIG. 6 depicts a high level block diagram of a controller suitable for use in the communications network architecture of FIG. 1. Specifically, the exemplary controller 600 of FIG. 6 comprises a processor 610, a memory 620 for storing various element management, network management, connection management, traffic management and control programs 625, support circuits 630 and input-output circuit 640.

The processor 610 cooperates with conventional support circuits 630, such as power supplies, clock circuits, cache memory and the like, as well as circuits that assist in executing the programs 625 stored in memory 620. As such, it is contemplated that some of the process steps disclosed herein as software processes may be implemented within hardware, for example, as the support circuits 630 that cooperate with the processor 610 to perform various steps.

The controller 600 includes input-output circuit 640 that forms an interface between the various functional elements of controller 600 for communicating with the intermediate nodes 124 and the end node 126 as depicted in communication network 120 of FIG. 1. In one embodiment, controller 600 of FIG. 6 is configured to communicate with management system 160 of FIG. 1. In this embodiment, as depicted in FIG. 1, management system 160 communicates with communication network 120 via communication link 170.

Although the controller 600 of FIG. 6 is depicted as a general purpose computer that is programmed to perform various connection path establishment functions in accordance with the present invention, the invention can be implemented in hardware as, for example, an application specific integrated circuit. As such, the process steps described herein are intended to be broadly interpreted as being equivalently performed by software and hardware, either singly or in combination.

Although the methodologies of the present invention are described herein with respect to a linear chain of nodes having a begin node at one end of the linear chain and an end node at another end of the linear chain, the inventor also contemplates that the begin node and end node may be located at any point in the linear chain of nodes scheduled to form the connection path.

Although various embodiments which incorporate the teachings of the present invention have been shown and described in detail herein, those skilled in the art can readily devise many other varied embodiments that still incorporate these teachings.

What is claimed is:

1. A method, comprising:
   determining a plurality of nodes scheduled to form a connection path between a begin node and an end node;
   contemporaneously transmitting respective connection request messages to the nodes scheduled to form the connection path;
   processing the connection request messages at the respective nodes for initiating formation of respective portions of the connection path; and
   transmitting respective connection request acknowledgment messages from the respective nodes toward the end node in series, wherein:
      for each of the nodes, the connection request acknowledgement message transmitted from the node is indicative of whether the node was successfully provisioned to support the respective portion of the communication path;
      for each of the nodes, the connection request acknowledgement message transmitted from the node is transmitted such that the intended destination of the connection request acknowledgement message is an adjacent node on the connection path that is downstream of the node from which the connection request acknowledgment message is transmitted, wherein the downstream adjacent node is determined from information included within the connection request message received at the node;
      for each of the nodes other than the node adjacent to the begin node, the connection request acknowledgment message transmitted from the node is transmitted in response to completion of processing of the respective connection request message at the node and receiving the connection request acknowledgement message transmitted from an adjacent node on the connection path that is upstream of the node.

2. The method of claim 1, wherein the step of contemporaneously transmitting is initiated in response to a connection setup message received by one of the plurality of nodes.

3. The method of claim 2, wherein the connection setup message identifies the plurality of nodes scheduled to form the connection path.

4. The method of claim 2, wherein the connection setup message is received from at least one of another node in communication with the plurality of nodes and a management system in communication with the plurality of nodes.

5. The method of claim 1, wherein the connection request messages traverse a path identical to the connection path to be formed or at least one of a plurality of paths connecting said plurality of nodes.

6. The method of claim 1, wherein:
   for the node adjacent to the end node, the connection request acknowledgement message is transmitted such that the intended destination of the connection request acknowledgement message is the end node; and
   for the node adjacent to the begin node, the connection request acknowledgment message is transmitted in response to completion of processing of the respective connection request message at the node.

7. The method of claim 1, further comprising:
   transmitting a connection request response message from the end node toward the begin node, the connection request response message indicating a status of the connection path.

8. The method of claim 7, wherein the connection request response message is a connection request successful message or a connection request failed message.

9. The method of claim 8, wherein the connection request failed message is transmitted in response to at least one of
   at least one of the connection request acknowledgement messages being negative; and
   at least one of the connection request acknowledgement messages being received by the end node after a threshold time.

10. The method of claim 9, wherein the threshold time begins when the end node receives a connection request message.

11. A method for establishing a connection between a begin node and an end node via a plurality of intermediate nodes, comprising:

receiving, at the end node, a connection request message requesting a connection between the begin node and the end node, wherein the connection request message identifies each of the intermediate nodes scheduled to form the connection between the begin node and the end node;

receiving, at the end node from each of the intermediate nodes, a respective connection request acknowledgment message indicative of whether processing of respective connection request message by the intermediate node was successful or unsuccessful;

determining, at the end node, a status of the connection path using the connection request acknowledgement messages, wherein the status of the connection path is indicative of whether establishment of the connection path was successful or unsuccessful; and propagating, from the end node toward the begin node, a connection request response message indicating the status of the connection path.

* * * * *